United States Patent
De Vry

[15] 3,663,167
[45] May 16, 1972

[54] MANUFACTURE OF HIGH PURITY NITRIC OXIDE

[72] Inventor: Frank E. De Vry, Greenville, Del.
[73] Assignee: Hercules Incorporated, Wilmington, Del.
[22] Filed: Sept. 21, 1970
[21] Appl. No.: 74,076

Related U.S. Application Data

[63] Continuation-in-part of Ser. No. 731,959, May 24, 1968, abandoned.

[52] U.S. Cl. .............................................................. 23/157
[51] Int. Cl. ...................................................... C01b 21/26
[58] Field of Search .............................................. 23/157–162

[56] References Cited

UNITED STATES PATENTS

| | | | |
|---|---|---|---|
| 1,948,968 | 2/1934 | Kramer et al. | 23/157 |
| 2,935,480 | 5/1960 | Levering et al. | 23/159 X |
| 2,046,162 | 6/1936 | Handforth et al. | 23/162 X |
| 3,110,563 | 11/1963 | Krauss et al. | 23/162 |

*Primary Examiner*—Oscar R. Vertiz
*Assistant Examiner*—G. O. Peters
*Attorney*—S. Grant Stewart

[57] ABSTRACT

Process, integrated with ammonia air oxidation, for the manufacture of nitric oxide of at least 99 percent purity comprising the steps of (1) effecting the ammonia oxidation, (2) maintaining maximum NO content in the oxidation effluent, and then contacting the effluent with nitric acid to convert the NO to $NO_2$, (3) cooling the $NO_2$ containing gas product to condense the $NO_2$ therefrom as liquid $N_2O_4$, (4) passing the liquid $N_2O_4$ into a packed converter tower and therein at least partially vaporizing the liquid; passing resulting vaporization product upwardly through the tower packing and passing water or weak nitric acid into the tower and downwardly through the packing in countercurrent flow reaction contact with the vaporization product, and then into the zone of said vaporization and reaction contact with any unvaporized liquid, and vaporization product — to convert substantially all of the initially added liquid dinitrogen tetroxide to nitric oxide gas product containing minor contaminant amounts of $NO_2$, $HNO_3$ and water, (5) water-scrubbing the $NO_2$ and $HNO_3$ contaminants from the NO gas product to form resulting water-wet NO gas product containing, on an anhydrous basis, at least 99 percent NO, and (6) dehydrating the water-wet NO gas product to form said NO of at least 99 weight percent purity. Strong nitric acid is formed in the converter tower as by-product.

9 Claims, 1 Drawing Figure

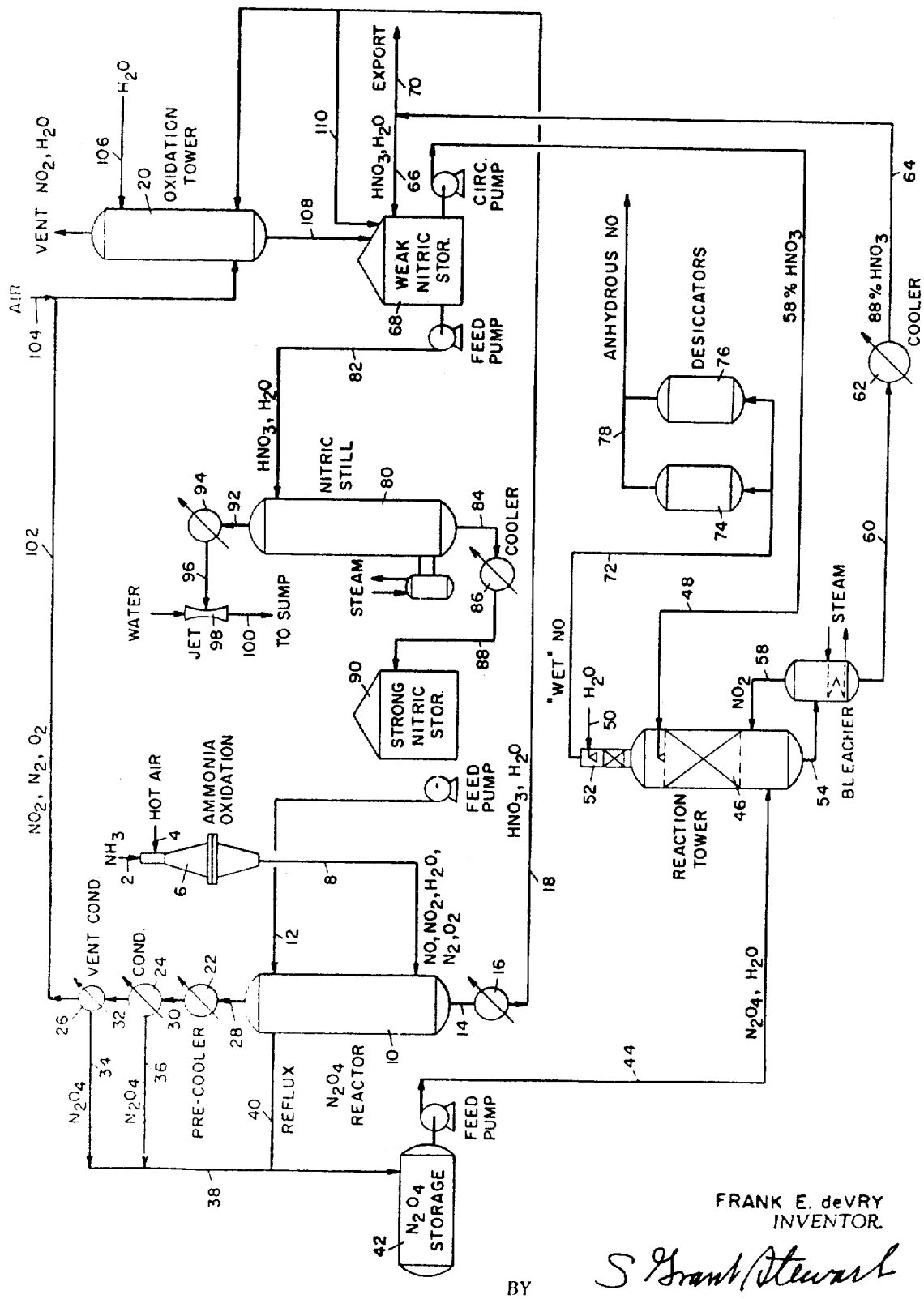

MANUFACTURE OF HIGH PURITY NITRIC OXIDE

This application is a continuation-in-part of my copending application Ser. No. 731,959, filed May 24, 1968 now abandoned.

This invention relates to the production of nitric oxide and more particularly to an integrated process for the production of anhydrous nitric oxide of high purity.

The potential of nitric oxide as a widely used chemical product has long been realized. However, the economic burdens of conventional preparation of the product have, to a considerable extent, retarded more general usage.

Now, in accordance with the present invention, it has been found that high yields of nitric oxide having a purity of at least 99 percent can be obtained based upon a unique combination of processing steps which gives a high yield of valuable by-product when desired, whereby the overall system attains a new level of economic attractiveness.

Accordingly, a primary object of the present invention contemplates a single, overall process in which a basic ammonia oxidation process for the production of nitric acid is integrated with the successive synthesis of nitrogen tetroxide and its conversion to nitric oxide to yield a nitric oxide end product of at least 99 percent purity and only a single by-product; that is, strong nitric acid having a concentration of more than about 76 percent. Such high purity nitric oxide is becoming increasingly important in its own right and as a raw material for the manufacture of $N_2O_3$ and $NOCl$. Thus, the attainment of the present object serves to considerably accelerate the importance of this product.

Other objects of the invention will appear hereinafter the novel features and combinations being set forth in the appended claims.

Generally stated, this invention is an overall process for the manufacture of nitric oxide product containing at least 99 weight percent NO, beginning with the production of nitric oxide as part of a mixture of reaction products resulting from the air oxidation of ammonia. The nitric oxide thus formed is first reacted, as a component of the total ammonia oxidation effluent, with nitric acid, to convert it to nitrogen dioxide, with subsequent separation of the nitrogen dioxide as dinitrogen tetroxide condensate. The liquid dinitrogen tetroxide is then recovered and converted back to nitric oxide by reaction, in at least partially evaporated form, with water (as such or in the form of weak nitric acid). Small contaminant amounts of nitrogen dioxide and nitric acid are water-scrubbed from the nitric oxide product, and the resulting wet nitric oxide is dehydrated to yield the nitric oxide end product. Nitric acid is formed during the nitric oxide forming step and is removed from the process as strong acid by-product.

The tail gases from the dinitrogen tetroxide condensation, which include minor amounts of entrained nitric oxide and nitrogen dioxide, are conducted to a conventional oxidation and absorption tower where the remaining oxides of nitrogen are converted to nitric acid; and the water formed during the nitric oxide conversion to nitrogen dioxide is removed from the system in form of diluted nitric acid which may be used as such or concentrated in a vacuum still. A method for preparing liquid dinitrogen tetroxide, starting with air oxidation of ammonia, is disclosed in U.S. Pat. No. 3,063,804 to D. G. Morrow. The term "nitrogen dioxide" as used herein connotes $NO_2$, $N_2O_4$ or such equilibrium mixture of $NO_2$ and $N_2O_4$ as may exist under the conditions prevailing in each step of the process.

More specifically, the invention provides an overall process integrated with conventional ammonia air oxidation for the manufacture of at least about 99 percent purity nitric oxide, which comprises air-oxidizing ammonia in the presence of a stoichiometric excess of air to form, as total effluent, a gas mixture containing nitric oxide as substantially the only nitrogen oxide product; maintaining said total effluent at a temperature sufficiently high to retain substantially all of said nitric oxide product therein, and countercurrently contacting said effluent, initially at said temperature, with downwardly flowing nitric acid to react said nitric oxide with said nitric acid to convert said nitric oxide to nitrogen dioxide, and thereby form resulting nitrogen dioxide gas product containing nitrogen and oxygen components of said excess air; cooling said nitrogen dioxide gas product sufficiently to condense substantially all of said nitrogen dioxide therefrom as liquid dinitrogen tetroxide without condensation of said nitrogen and oxygen components; introducing said liquid dinitrogen tetroxide into an upwardly extending tower containing a packed section along its length, and then vaporizing at least a portion of said liquid; passing resulting vaporization product upwardly through said packed section, and passing water or weak nitric acid into said tower and then downwardly through said packed section in countercurrent flow reaction contact with said upwardly flowing vaporization product and then into the zone of said vaporization in reaction contact therein with any unvaporized portion of said liquid nitrogen tetroxide and vaporization product to convert substantially all of said liquid dinitrogen tetroxide, initially introduced into said tower, to nitric oxide and thereby form nitric oxide gas product containing small contaminant amounts of water, nitrogen dioxide and nitric acid; passing said nitric oxide gas product from said tower, and water-scrubbing substantially all of said nitrogen dioxide and nitric acid contaminants therefrom to form resulting water-wet nitric oxide containing, on a substantially anhydrous basis, at least 99 weight percent NO; and dehydrating said wet nitric oxide to form nitric oxide product containing at least 99 weight percent NO. Strong nitric acid is withdrawn from the tower as by-product of the nitric oxide forming reaction.

The ammonia oxidation step is conducted under well known high temperature catalytic conditions such as, for example, utilizing an ammonia to air gas volume ratio of from about 9:1 to 11:1, a suitable ammonia oxidation catalyst such as 90 percent platinum–10 percent rhodium at a catalyst temperature of about 900° to 1,200° C., and a pressure of about 0 to 200 p.s.i.g., to produce nitric oxide in accordance with the equation

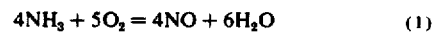
$$4NH_3 + 5O_2 = 4NO + 6H_2O \qquad (1)$$

It is an important requirement that substantially all nitric oxide formed during the oxidation be available for the subsequent reaction with nitric acid to form nitrogen dioxide, in order to accomplish formation of nitric oxide end product in maximum yield. It is therefore necessary that until the total gas effluent from the oxidation is introduced into the nitric acid reaction to form nitrogen dioxide, it be maintained at a sufficiently high temperature, generally at least 600° F., to substantially preclude loss of nitric oxide product to reaction with the excess oxygen present, which would otherwise occur in accordance with the equation $$NO + 1/2 O_2 \rightleftharpoons NO_2 \qquad (2)$$

The nitric acid, nitric oxide reaction to convert the nitric oxide to nitrogen dioxide proceeds in accordance with the well known equilibrium,

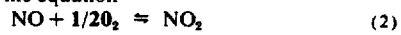
$$NO + 2HNO_3 = 3NO_2 + H_2O \qquad (3)$$

generally utilizing nitric acid containing at least 50 weight percent $HNO_3$, at a temperature within the range of from 150° to 225° F. and a pressure within the range of from atmospheric to 150 p.s.i.g.

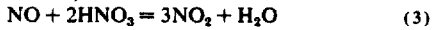

The high yield of nitric oxide end product is accomplished in practice of the invention by first reacting the nitric oxide product of ammonia oxidation with nitric acid to obtain 3 moles nitrogen dioxide per mole of nitric oxide initially formed during the ammonia oxidation, thereby providing three times the amount of nitrogen dioxide available for condensation that would be obtained by conventional cooling of the ammonia oxidation effluent and direct recovery of the nitrogen dioxide formed. The combination of steps involving maintaining minimum temperature of the ammonia oxidation effluent and reaction of nitric acid with all nitric oxide retained therein, is therefore critical to the accomplishment of high yield of nitric oxide end product.

In order that the end nitric oxide product, which contains at least 99 percent NO, be accomplished, the nitrogen dioxide formed during the nitric oxide, nitric acid reaction must be substantially free from dissolved or entrained nitrogen and oxygen from the ammonia oxidation. Conventional fractionation of the gas effluent from the nitric acid, nitric oxide reaction to produce nitrogen dioxide of the requisite purity for subsequent conversion to nitric oxide is undesirable from the standpoint of time, power, equipment and manpower requirements. Such is made unnecessary in accordance with the invention and is accomplished by cooling the total gas effluent from the nitric acid, nitric oxide reaction to condense the nitrogen dioxide therefrom as liquid nitrogen tetroxide, under which conditions none of the other gas effluent components, except water, undergo condensation, and are therefore readily separated from the condensate as tail gases for further processing. Generally, cooling of the total effluent gas from the nitric oxide, nitric acid reaction is accomplished in a plurality of stages at progressively lower temperature levels.

The total gas effluent emerging from the nitric oxide forming step contains nitric oxide end product with minor contaminant amounts of unreacted nitrogen dioxide, weak nitric acid and water vapor. The nitrogen dioxide and nitric acid contaminants are water-scrubbed substantially free of nitrogen dioxide and nitric acid contaminants under ambient temperature conditions, and residual "wet" nitric oxide stream is subsequently dehydrated generally by contact with solid desiccant to provide the nitric oxide end product of the invention.

The liquid dinitrogen tetroxide introduced into the packed tower is reactable with the water or weak nitric acid as nitrogen tetroxide, or nitrogen dioxide, or both, depending on local temperature and pressure conditions. However, to the extent that the liquid nitrogen tetroxide is reacted, as such, substantially all reaction with the water or weak nitric acid takes place in the tower section adjacent the point of ingress of the liquid reactant.

The invention will be illustrated in greater detail with reference to the accompanying diagrammatic drawing in which the description is an example of plant operation of the invention and the percentages given are by weight unless otherwise designated. The rate amounts given correspond to the production of 5 tons of nitric oxide per 24-hour day. Although the following description has been divided into several steps for the purpose of clarity, it will be understood that the overall process is integrated and may be operated as a continuous process.

STEP I — PRODUCTION OF CRUDE DINITROGEN TETROXIDE

Anhydrous ammonia from conduit 2 at the rate of 10.2 lbs./min. is mixed with preheated air from conduit 4 to make a mixture containing 10.3 percent $NH_3$ by volume which is then passed over a platinum-rhodium catalyst in a conventional ammonia oxidation converter 6 at approximately 110 p.s.i.g. to form an oxidation product mixture having the following composition by volume:

| | | |
|---|---|---|
| $N_2$ | = | 72.1% |
| NO | = | 10.7 |
| $H_2O$ | = | 10.1 |
| $O_2$ | = | 7.1 |
| | | 100.0% |

The temperature of this gas mixture is maintained between 660° F. and 700° F. by means of a cooling jacket on conduit 8 (not shown) and the stream is conducted under those temperature conditions as quickly as possible to a nitrogen tetroxide reactor 10 to thereby retain therein substantially all nitric oxide formed during the oxidation. Here the hot gas stream in reactor 10 is countercurrently contacted by 170 lbs./min. of 63.5 percent nitric acid, as fed through conduit 12 under which conditions the nitric oxide component of the gas stream is converted to nitrogen dioxide by reaction with the nitric acid in accordance with the well known equilibrium as shown in equation 3 above. The nitric acid is used in approximately 300 percent excess over that stoichiometrically required for the reaction, the surplus serving as a heat sink and also to allow even wetting of the packing which occupies the reaction zone of the reactor 10. The operating pressure in the reactor 10 is maintained at about 100 p.s.i.g. by regulation of the flow of total spent gas effluent. This spent gas flow rate is 128 lbs./min. and the spent gas is of the following composition:

| | | |
|---|---|---|
| $N_2$ | = | 83.5% |
| $NO_2$ | = | 9.6 |
| $O_2$ | = | 6.9 |
| | | 100.0% |

The water formed in the reaction acts to dilute the excess nitric acid to weak acid, which is allowed to exit from the bottom of nitrogen tetroxide reactor 10 through conduit 14 to a level regulator and acid cooler 16. The weak acid rate is 164 lbs./min. and the strength of the weak acid is 50 percent. It is fed from acid cooler 16 through conduit 18 to an oxidation tower 20 for concentration to 61 percent strength.

A crude nitrogen tetroxide product containing approximately 1.5 percent water is continuously condensed from the overhead gas stream leaving the nitrogen tetroxide reactor 10. This is accomplished by means of a pre-cooler 22 followed by a brine-cooled main and vent condensers 24 and 26, connected by conduits 28, 30 and 32 respectively, operating at 22° F. and 15° F. respectively. The rate of condensation is 43.8 lbs./min. and is passed from condensers 24 and 26 through conduits 34 and 36 into conduit 38. Of this amount, 12.3 lbs./min. is returned to the reactor 10 through conduit 40 as reflux and 31.5 lbs./min. removed as crude liquid dinitrogen tetroxide through the conduit 38 and conducted to a storage tank 42.

STEP II — PRODUCTION AND DEHYDRATION OF NITRIC OXIDE

Nitric oxide is produced by reversing the reaction by which nitrogen dioxide is formed in reactor 10, as shown by the equation $$3NO_2 + H_2O \rightleftharpoons NO + 2HNO_3 \quad (4)$$

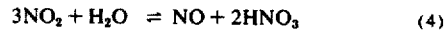

This is accomplished in a packed reaction tower operating at from atmospheric to about 150 p.s.i.g. and at a temperature range of from about 150° to about 225° F.

The nitrogen tetroxide produced in the preceding step (31.5 lbs./min.) is fed from the storage tank 42 through conduit 44 into the nitric oxide reaction tower 46 as a liquid and at a point just below the packing support, wherein it is at least partially vaporized to form nitrogen dioxide including a minor proportion of nitrogen tetroxide. The water for the reaction is supplied partly from the water in 18.1 lbs./min. of 58 percent nitric acid which is pumped through conduit 48 into the reaction tower 46 and over the reactor packing countercurrent to the flow of nitrogen dioxide and partly from 1.9 gals./min. of water fed through conduit 50 into scrubber 52 at the top of tower 46 used to scrub the nitric oxide product free from entrained nitrogen dioxide and nitric acid. Thus, the nitric acid undergoes a concentration as well as an increase in total quantity as it passes down the tower 46 and passes from the bottom thereof as 45.8 lbs./min. having a strength approaching 88 percent. This acid is then passed through conduit 54 into a steam heated bleacher 56 and heated to 215° F. to remove dissolved nitrogen dioxide with the overhead nitrogen dioxide passed through conduit 58 into the bottom of tower 46. The acid from the bottom of bleacher 56 is passed through conduit 60 into a cooler 62 and is passed therefrom through conduit 64 and is then divided into two streams. The first stream of 22.7 lbs./min. is returned through conduit 66 to the weak nitric (58 percent) storage tank 68 while the second stream of 22.0 lbs./min. is withdrawn from the system through conduit 70 as an export stream of by-product 88 percent nitric acid.

The effluent gaseous product nitric oxide issues from the top of the tower 46 at the rate of 7.0 lbs./min. and has the following analysis by volume:

| | | |
|---|---|---|
| NO | = | 98.7% |
| $NO_2$ | = | 1.0 |
| $H_2O$ | = | 0.3 |
| | | 100.0% |

The water is removed by passing this wet gas through conduit 72 into desiccators 74 and 76 containing activated alumina. The final anhydrous nitric oxide product contains about 99.0 percent NO and about 1.0 percent $NO_2$ and is withdrawn from the system through conduit 78.

STEP III — REMOVAL OF WATER FROM THE PROCESS

An inspection of the overall water valance shows that 16.6 lbs./min. of water must be removed from the process as such. This is accomplished in a vacuum still 80 which is fed through conduit 82 at the rate of 186.0 lbs./min. of 58 percent nitric acid from storage tank 68 and concentrating it to 169.4 lbs./min. of 63.5 percent nitric acid with removal of 16.6 lbs./min. of water as condensate. The still 80 operates at an average pressure of 135 mm. Hg absolute and the bottom product therefrom is passed through conduit 84 to a cooler 86 and therefrom through conduit 88 to the strong nitric (63.5 percent) storage tank 90. The overhead product from the still 80 is passed through conduit 92 to a cooler 94 and therefrom through conduit 96 to a water jet 98 and then to sump conduit 100. Moreover, overhead product from the vent condenser 26 is passed through conduit 102 with injection of air through line 104 into the bottom of oxidation tower 20. The weak acid from line 18 also passes into the bottom of tower 20. Water through conduit 106 is fed to the top of the tower 20 in counterflow to the gaseous products. The nitric acid of 61 percent strength heretofore referred to is withdrawn from the bottom of the tower 20 and passed through conduit 108 to the weak nitric storage tank 68. Since weak nitric acid of 50 percent strength is passed from conduit 18 through conduit 110 into storage tank 68 from about 15 to about 20 percent of the strong acid from line 66 is added thereto and the resulting fortified acid is of 58 percent strength for pumping to the tower 46 and to the vacuum still 80 through conduits 48 and 82, respectively.

From the above example, it will be seen how the several steps are combined into a single, unified and continuous process for the production of anhydrous nitric oxide. The process lends itself well to integration with an existing high pressure nitric acid plant. In this case it has the advantage of allowing the concentration of nitric acid above the usual normal limit of 63 percent obtained from the typical ammonia oxidation nitric acid process. The 88 percent nitric acid obtained according to the above example is sufficiently strong for many industrial uses. It can, however, be further concentrated in a separate vacuum still to 99 percent, since the starting acid strength is above the 65 percent azeotrope limit.

In instances where there is no economic advantage in having a high-strength stream of by-product export nitric acid, the high strength acid may be used as part of the acid feed to the nitric acid-nitric oxide reactor. This has two advantages: (1) it will increase the efficiency of the nitric oxide conversion by increasing the strength of the feed nitric acid and (2) it will relieve some of the water removal load from the nitric acid vacuum still.

Thus, it is evident that there are several factors which will influence conditions for the most satisfactory operation of the invention, the actual requirements of which are determined by the end product and by-product involved. Although the embodiment of the invention described gave a by-product of high strength 88 percent nitric acid, it will be appreciated that the process may be attractively practiced to obtain anhydrous nitric oxide of high purity as the end product with high strength niric acid as by-product having a concentration of from about 76 to about 88 percent. Moreover, it will be appreciated that this strong by-product acid may be obtained when the process is operated in conjunction with weak nitric acid having a concentration of from about 40 to about 62 percent and even when the acid concentration is as low as 5 percent.

It will be seen, therefore, that this invention may be carried out by the use of various modifications and changes without departing from its spirit and scope, with only such limitations placed thereon as are imposed by the appended claims.

What I claim and desire to protect by Letters Patent is:

1. A process integrated with conventional ammonia air-oxidation for the manufacture of at least about 99 percent purity nitric oxide, which comprises air-oxidizing ammonia in the presence of a stoichiometric excess of air to form, as total effluent, a gas mixture containing nitric oxide as substantially the only nitrogen oxide product; maintaining said total effluent at a temperature sufficiently high to retain substantially all of said nitric oxide product therein, and countercurrently contacting said effluent, initially at said temperature, with downwardly flowing nitric acid to react said nitric oxide with said nitric acid to convert said nitric oxide to nitrogen dioxide, and thereby form resulting nitrogen dioxide gas product containing nitrogen and oxygen components of said excess air; cooling said nitrogen dioxide gas product sufficiently to condense substantially all of said nitrogen dioxide therefrom as liquid dinitrogen tetroxide without condensation of said nitrogen and oxygen components; introducing said liquid dinitrogen tetroxide into an upwardly extending tower containing a packed section along its length, and then vaporizing at least a portion of said liquid; passing resulting vaporization product upwardly through said packed section, and passing water or weak nitric acid into said tower and then downwardly through said packed section in countercurrent flow reaction contact with said upwardly flowing vaporization product and then into the zone of said vaporization in reaction contact therein with any unvaporized portion of said liquid nitrogen tetroxide and vaporization product to convert substantially all of said liquid dinitrogen tetroxide, initially introduced into said tower, to nitric oxide and thereby form nitric oxide gas product containing small contaminant amounts of water, nitrogen dioxide and nitric acid; passing said nitric oxide gas product from said tower, and water-scrubbing substantially all of said nitrogen dioxide and nitric acid contaminants therefrom to form resulting water-wet nitric oxide containing, on a substantially anhydrous basis, at least 99 weight percent NO; and dehydrating said wet nitric oxide to form nitric oxide product containing at least 99 weight percent NO.

2. In a process of claim 1, introducing said liquid dinitrogen tetroxide into an open lower section of said tower subjacent said packed section, whereby said zone of vaporization is substantially in said lower tower section; introducing said water or weak nitric acid into an upper open section of said tower adjacent and above said packed section; and passing said nitric oxide gas product from said tower at a point above the ingress of said water or weak nitric acid into said upper tower section.

3. In a process of claim 2, water-scrubbing said nitric oxide product by passing same from said upper tower section into countercurrent flow contact with water, to thereby water-absorb substantially all of said nitrogen dioxide and nitric acid contaminants from said nitric oxide gas product; and passing residual water from said scrubbing contact into said upper tower section for flow through said packed section together with said water or weak nitric acid separately passed into said tower.

4. In a process of claim 3, passing nitric acid containing from about 40 to about 62 weight percent $HNO_3$ into said upper tower section for said countercurrent flow reaction contact to form said nitric oxide, and recovering strong nitric acid by-product containing from about 76 to 88 weight percent $HNO_3$.

5. In a process of claim 4, withdrawing total acid from said tower at a point below the tower ingress of said liquid dinitrogen tetroxide, and then heating the withdrawn acid to remove any dissolved nitrogen dioxide therefrom; returning nitrogen dioxide thus removed from said acid to said countercurrent contact with said weak nitric acid; and recovering resulting residual acid as said strong nitric acid by-product.

6. In a process of claim 4, contacting said ammonia oxidation effluent with nitric acid containing at least 50 weight percent $HNO_3$ to form said nitrogen dioxide gas product.

7. In a process of claim 4, said nitric acid for reaction to form said nitric oxide having a concentration of about 58 weight percent $HNO_3$.

8. A process in accordance with claim 1 in which said tower is operated at from atmospheric to about 150 p.s.i.g. and at a temperature of from about 150° to 225° F.

9. In a process of claim 4, said nitric oxide product containing about 99 percent nitric oxide and about 1 percent nitrogen dioxide.

* * * * *